(12) United States Patent
Takizawa

(10) Patent No.: US 8,929,608 B2
(45) Date of Patent: Jan. 6, 2015

(54) DEVICE AND METHOD FOR RECOGNIZING THREE-DIMENSIONAL POSITION AND ORIENTATION OF ARTICLE

(71) Applicant: FANUC Corporation, Minamitsuru-gun, Yamanashi (JP)

(72) Inventor: Shota Takizawa, Yamanashi (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 39 days.

(21) Appl. No.: 13/670,679

(22) Filed: Nov. 7, 2012

(65) Prior Publication Data
US 2013/0114861 A1    May 9, 2013

(30) Foreign Application Priority Data

Nov. 8, 2011  (JP) ................................. 2011-244761

(51) Int. Cl.
*G06K 9/00* (2006.01)
*G06T 7/00* (2006.01)

(52) U.S. Cl.
CPC .............. *G06T 7/004* (2013.01); *G06T 7/0044* (2013.01); *G06T 2200/04* (2013.01); *G06T 2207/10028* (2013.01); *G06T 2207/30164* (2013.01); *G06T 2207/30244* (2013.01)
USPC ...................................................... 382/106

(58) Field of Classification Search
None
See application file for complete search history.

(56) References Cited

U.S. PATENT DOCUMENTS

| | | | | |
|---|---|---|---|---|
| 4,985,846 | A * | 1/1991 | Fallon | 382/153 |
| 7,706,918 | B2 * | 4/2010 | Sato et al. | 700/245 |
| 7,957,583 | B2 * | 6/2011 | Boca et al. | 382/154 |
| 8,559,699 | B2 * | 10/2013 | Boca | 382/153 |
| 2011/0150286 | A1 * | 6/2011 | Ishigami et al. | 382/106 |
| 2011/0206274 | A1 | 8/2011 | Tateno et al. | |

FOREIGN PATENT DOCUMENTS

| | | |
|---|---|---|
| JP | 6-165036 A | 6/1994 |
| JP | 7-270137 A | 10/1995 |
| JP | 07-287756 A | 10/1995 |
| JP | 9-196636 A | 7/1997 |
| JP | 10-118975 A | 5/1998 |
| JP | 2004-144557 A | 5/2004 |
| JP | 2004-272841 A | 9/2004 |
| JP | 2005-062063 A | 3/2005 |

(Continued)

OTHER PUBLICATIONS

Roger Y. Tsai, "An Efficient and Accurate Camera Calibration Techinque for 3D Machine Vision", IEEE Proc. Computer Vision and Pattern Recognition '86, 1986, pp. 364-374.

*Primary Examiner* — Shervin Nakhjavan
(74) *Attorney, Agent, or Firm* — Drinker Biddle & Reath LLP

(57) ABSTRACT

A recognition device and method capable of recognizing 3D position and orientation of an article at low calculation cost. A 2D image of a region, where articles are randomly located, is obtained by a camera, and 3D information of generally the same region is obtained by a range sensor. A space, where an article to be taken out is considered to exist, is roughly limited. Based on the limited space, a search condition for searching the article by 2D image processing is set, and 2D positional information on the image of the article is obtained. Then, 3D point data used to recognize the 3D position and orientation of the article is selected, and a view line in the 3D space, extending from the camera to the article, is calculated, whereby the 3D position and orientation of the article is calculated.

15 Claims, 4 Drawing Sheets

(56) References Cited

FOREIGN PATENT DOCUMENTS

| | | |
|---|---|---|
| JP | 2007-203406 A | 8/2007 |
| JP | 2009-128191 A | 6/2009 |
| JP | 2011-133313 A | 7/2011 |
| JP | 2011-174879 A | 9/2011 |
| JP | 2011-209019 A | 10/2011 |

* cited by examiner

A-A' SECTION

DEVICE AND METHOD FOR RECOGNIZING THREE-DIMENSIONAL POSITION AND ORIENTATION OF ARTICLE

RELATED APPLICATION DATA

This application claims priority under 35 U.S.C. §119 and/or §365 to Japanese Application No. 2011-244761 filed Nov. 8, 2011, the entire contents of which are incorporated herein by reference.

BACKGROUND OF THE INVENTION

1. Field of the Invention

The present invention relates to a recognition device and a recognition method for recognizing a three-dimensional position and orientation of an article, which are used when the article is taken out by using a robot.

2. Description of the Related Art

In a robot system for taking out an article by using a robot, information regarding the article is obtained by a camera or a three-dimensional vision sensor connected to an information processor or a robot controller, and the obtained information is used to correct the motion of the robot which takes out the article or inspects the article.

As the three-dimensional vision sensor, for example, various range sensors, capable of measuring a distance to an object to be measured, are well known. Some range sensors can obtain three-dimensional information of a relatively wide area. These range sensors may obtain information regarding a three-dimensional shape of an article, which cannot be obtained by an imager such as a camera, as a range imagery or a height map or the like.

Japanese Unexamined Patent Publication (Kokai) No. 7-270137 discloses a spotlight scanning-type three-dimensional vision sensor, and describes that "the three-dimensional vision sensor makes it possible to effectively carry out flexible measurement, corresponding to the size, shape, perspective and required three-dimensional positional information of the object to be measured, by constituting a measurement system wherein a spotlight injection means capable of freely changing the light injecting direction by two-dimensional random scanning control is combined with a position sensing detector (PSD) having a one-dimension position sensing function."

Japanese Unexamined Patent Publication (Kokai) No. 9-196636 discloses a method for obtaining data of the shape of an article, and describes that "in carrying out calibration of a position detector 1 and obtaining a shape of an article by using position detector 1, which is constituted by a slit light source 2 for irradiating slit light I to article W to be measured and a camera 3 for capturing am image of slit light I, position detector 1 is moved at predetermined times so as to determine a camera parameter in a perspective transformation equation for converting a coordinate system of article W into a coordinate system on the image by camera 3, a lit light parameter in a plane equation of slit light I irradiated on article W, and a model parameter in a geometric representation equation for representing the shape of article W. Then, the calibration of the slit light and the camera and obtaining of the shape data of article W are automatically carried out together in the robot coordinate system."

Japanese Unexamined Patent Publication (Kokai) No. 2005-62063 describes that "an irradiation pattern is irradiated onto an article to be measured by means of a projector 2, a reflective image pattern of the irradiation pattern on article 1 is captured by means of a camera 8, the surface shape of article 1 is calculated by means of a shape calculating part 13 based on the reflective pattern, and a contrast ratio representing the measurement reliability of the article is calculated based on (Ia/(Pub−Plb)) by means of a reliability calculating part 14, wherein Plb and Pub are lower and upper limits of a light volume of the irradiation pattern, respectively, and Ia is the light volume. Then, data of the surface shape and the contrast ratio is output by a data outputting means, whereby the reliability of the shape measurement data of article 1, which is subject to multiple reflection, may be precisely detected corresponding to various pattern projection methods and correctly determined the relationship to each pixel of the captured image."

Further, Japanese Unexamined Patent Publication (Kokai) No. 2004-272841 discloses an article discriminating device having a scanning means for scanning a laser pulse in the width direction of a road, a reflected light detecting means for detecting reflected light of the laser pulse when the scanning means scans the laser pulse in the width direction of the road, a discriminating means for obtaining the height and width of an article positioned on a scanning line of the laser pulse obtained by the scanning means, and discriminating the type of article, by using a time lag between a timing when the scanning means scans the road in the width direction by using the laser pulse and a timing when the reflected light detecting means detects the reflected light of the laser pulse scanned in the width direction of the road, wherein the discriminating means judges that the article is a pedestrian when the height and width of the detected object in a pedestrian detection area having a certain width arranged at a side of the road are within a predetermined range.

On the other hand, some methods have been proposed for recognizing the position and orientation of an article by using a range sensor (or a distance sensor). For example, Japanese Unexamined Patent Publication (Kokai) No. 2009-128191 discloses an article recognition device and a robot device, and describes that "according to the article recognition device of the invention, by carrying out high-speed positioning based on an amount of characteristic such as a spin image, three-dimensional shape data (model) of an object and distance data (scene) obtained by a range sensor may be compared, whereby three-dimensional position and orientation of the object may be rapidly recognized."

Japanese Unexamined Patent Publication (Kokai) No. 2004-144557 discloses a three-dimensional vision sensor and describes that "sensor body 110 is constituted by light projector 130 attached to the hand of robot 40 and video camera 30. Light projector 130 projects slit light 131 onto a surface of object W positioned in operation area 50, video camera 30 receives a reflected light, and image processor 2 analyzes the reflected light and determines the surface where slit light 131 exists. Then, video camera 30 obtains an image by normal imaging, and a view line passing through measurement point Q is determined by using calibration data."

Further, some methods, for detecting the position of an article from an image, have been proposed. For example, Japanese Unexamined Patent Publication (Kokai) No. 6-165036 discloses a method for aligning radiological images, and describes that "template regions 8, 8' are set on X-ray image 4a, and template regions 9, 9' are set on X-ray image 4b. Then, template matching is carried out for aligning template regions 8, 8' with template regions 9, 9' by using a correlation method."

As a typical method for recognizing the position and orientation of an article by using a range sensor (distance sensor), a method for matching three dimensional information obtained by the range sensor with three-dimensional shape data of the article is possible, as disclosed in Japanese Unexamined Patent Publication (Kokai) No. 2009-128191. Generally, the conventional recognition method has very high cost of calculation, and requires a high-performance processor and a large-capacity memory. Therefore, it is very difficult to carry out such recognition process in a short period of time. Further, it is necessary to recognize the article with accuracy in order to take out the article by using the robot, however, a spatial density of the three-dimensional information obtained by the range sensor must be high in this case. Nevertheless, when the spatial density of the three-dimensional information is increased, a measurement time of the range sensor is extended and a calculation cost for matching process regarding the three-dimensional shape data of the article is also increased. Therefore, the taking out operation cannot be carried out.

The sensor for determining the three-dimensional information based on a time-of-flight of the laser pulse, as described in Japanese Unexamined Patent Publication (Kokai) No. 2004-272841, generally has a large size, and thus a cheaper sensor cannot be provided. Therefore, at this time, the range sensor has not been put into practical use in the field of the taking out operation using the robot.

On the other hand, although a method wherein the three-dimensional sensor and the two-dimensional sensor are combined, as described in Japanese Unexamined Patent Publication (Kokai) No. 2004-144557, is not intended to used the range sensor, the method is capable of recognizing the three-dimensional position and orientation of the article with relatively low calculation cost and amount of memory in comparison to the above recognition process. However, while the method in Japanese Unexamined Patent Publication (Kokai) No. 2004-144557 may reduce the calculation cost for processing the three-dimensional information, the method requires the process as described in Japanese Unexamined Patent Publication (Kokai) No. 6-165036, wherein the article is found within a measurement range of the sensor by using the two-dimensional image, and the calculation cost for the latter process may be increased.

It could be understood that the method of Japanese Unexamined Patent Publication (Kokai) No. 6-165036 is to recognize the two-dimensional positions of the articles having the different heights or orientations, based on the two-dimensional image.

However, in the method, it is necessary to carry out template-matching while enlarging or reducing the template in various sizes. Therefore, such a process takes time and it is difficult to realize the practical taking out operation.

SUMMARY OF THE INVENTION

An object of the present invention is to provide a recognition device and method capable of solving the above problems and recognizing three-dimensional position and orientation of an article at a low calculation cost, so that the device and method can be utilized in a versatile built-in device used in a manufacturing site.

According to one aspect of the present invention, a recognition device for recognizing a three-dimensional position and orientation of an article is provided, the recognition device comprising: a camera which obtains a two-dimensional image of an entire region wherein a plurality of the same kind of articles are randomly located; a range sensor which obtains three-dimensional information of a range which is generally the same as the region of the camera; and an information processor which processes the two-dimensional image obtained by the camera and the three-dimensional information obtained by the range sensor, wherein the information processor comprises: a search condition setting part which sets a region for searching an image of the article in the two-dimensional image, as a search condition, based on the three-dimensional information; a two-dimensional position obtaining part which detects an image of the article by image processing of the two-dimensional image under the set search condition and obtains two-dimensional positional information of the article on the two-dimensional image; a view line calculating part which calculates a view line in a three-dimensional space which extends from the camera to the article, based on the obtained two-dimensional positional information; a three-dimensional point data selecting part which selects first three-dimensional point data used to recognize a three-dimensional position and orientation of the article, from the three-dimensional information, based on the obtained two-dimensional positional information or the view line; and a three-dimensional position and orientation calculating part which calculates at least one of the position and the orientation of the article based on the selected first three-dimensional point data and the view line.

In a preferred embodiment, the range sensor is constituted by at least one camera and a device for projecting a pattern light, and wherein at least one camera of the range sensor is used as the camera for obtaining the two-dimensional image.

In a preferred embodiment, the range sensor is constituted by a plurality of cameras and a device for projecting a pattern light, and wherein the pattern light is used only to associate the same objects to be measured with each other, between images obtained by the plurality of the cameras.

In a preferred embodiment, the range sensor is constituted by at least one camera and a device for projecting a pattern light, and wherein an infrared light is used as a light source of the pattern light.

In a preferred embodiment, the search condition setting part selects second three-dimensional point data wherein a height value is larger than a predetermined value, from the three-dimensional information obtained by the range sensor; determines a region on the two-dimensional image obtained by the camera corresponding to a space containing the second three-dimensional point data; and limits a range for searching the article on the two-dimensional image within the determined region. In this case, the search condition setting part may further limit a range of an apparent size of the article to be searched on the two-dimensional image, based on a height value determined by the predetermined value or a range of values of a height of a space containing the selected second three-dimensional point data.

In a preferred embodiment, the search condition setting part extracts a flat surface, a curved surface or a combination thereof, from the three-dimensional information obtained by the range sensor; selects second three-dimensional point data corresponding to the extracted flat surface, curved surface or the combination thereof; determines a region on the two-dimensional image obtained by the camera corresponding to a space containing the second three-dimensional point data; and limits a range for searching the article on the two-dimensional image within the determined region. In this case, the search condition setting part may further limit a range of an apparent size of the article to be searched on the two-dimensional image, based on a range of values of a height of the selected second three-dimensional point data.

According to another aspect of the present invention, a recognition method for recognizing a three-dimensional position and orientation of an article is provided, the method comprising the steps of: obtaining a two-dimensional image of an entire region wherein a plurality of the same kind of articles are randomly located, by means of a camera; obtaining three-dimensional information of a range which is generally the same as the region of the camera, by means of a range sensor; setting a region for searching an image of the article in the two-dimensional image, as a search condition, based on the three-dimensional information; detecting an image of the article by image processing of the two-dimensional image under the set search condition and obtaining two-dimensional positional information of the article on the two-dimensional image; calculating a view line in a three-dimensional space which extends from the camera to the article, based on the obtained two-dimensional positional information; selecting first three-dimensional point data used to recognize a three-dimensional position and orientation of the article, from the three-dimensional information, based on the obtained two-dimensional positional information or the view line; and calculating at least one of the position and the orientation of the article based on the selected first three-dimensional point data and the view line.

In a preferred embodiment, the step of setting the search condition comprises: selecting second three-dimensional point data wherein a height value is larger than a predetermined value, from the three-dimensional information obtained by the range sensor; determining a region on the two-dimensional image obtained by the camera corresponding to a space containing the second three-dimensional point data; and limiting a range for searching the article on the two-dimensional image within the determined region. In this case, the step of setting the search condition may further comprise limiting a range of an apparent size of the article to be searched on the two-dimensional image, based on a height value determined by the predetermined value or a range of values of a height of a space containing the selected second three-dimensional point data.

In a preferred embodiment, the step of setting the search condition comprises: extracting a flat surface, a curved surface or a combination thereof, from the three-dimensional information obtained by the range sensor; selecting second three-dimensional point data corresponding to the extracted flat surface, curved surface or the combination thereof; determining a region on the two-dimensional image obtained by the camera corresponding to a space containing the second three-dimensional point data; and limiting a range for searching the article on the two-dimensional image within the determined region. In this case, the step of setting the search condition may further comprise limiting a range of an apparent size of the article to be searched on the two-dimensional image, based on a range of values of a height of the selected second three-dimensional point data.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
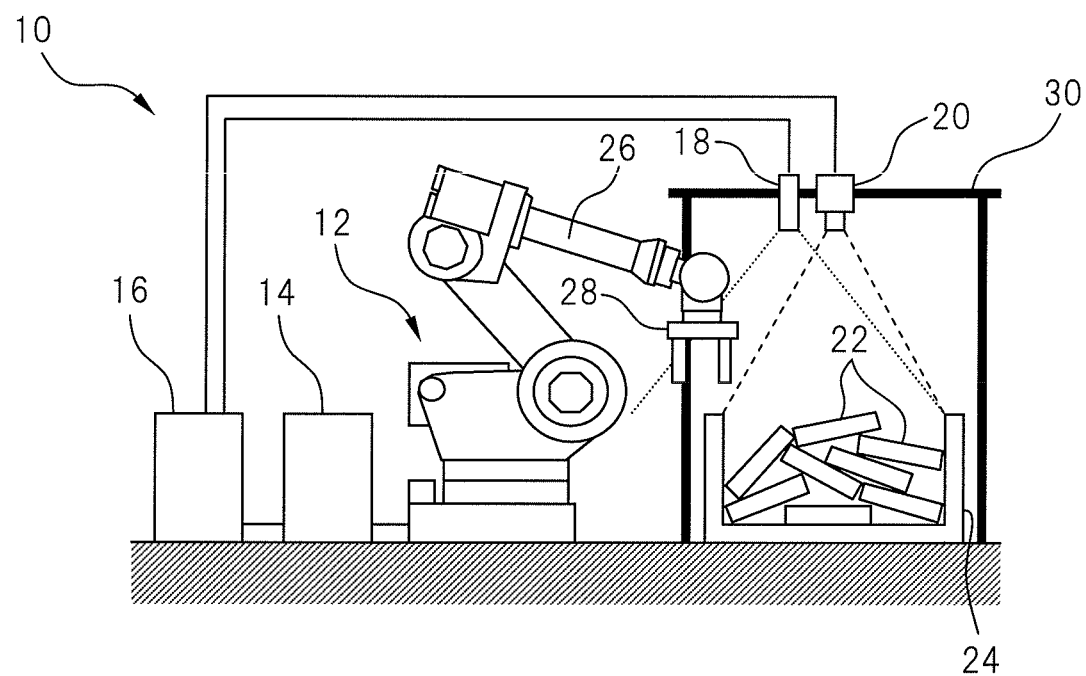
FIG. 1 is a view of a schematic configuration of a robot system including a recognition device according to an embodiment of the present invention.

FIG. 1 is a view showing a schematic configuration of a robot system 10 including a recognition device according to an embodiment of the present invention. Robot system 10 includes a robot 12, a robot controller 14 which controls robot 12, an information processor 16 connected to robot controller 14, a range sensor 18 and a camera 20, the range sensor and the camera being connected to information processor 16. Robot system 10 is used to take out an article, from a box 24 in which a plurality of the same kind of articles 22 are randomly located.

Robot 12 has a movable section such as a robot arm 26, and an article gripping section such as a robot hand 28 attached to a front end of robot arm 26. Robot hand 28 is configured to grip article 22 in box 24.

Range sensor 18 may obtain three-dimensional information of article 22 in box 24, and camera 20 may obtain or capture a two-dimensional image of article 22 in box 24. The obtained three-dimensional information and the two-dimensional image are transmitted to information processor 16 and processed by the information processor. It is preferable that range sensor 18 and camera 20 are arranged so that a measurement range of range sensor 18 and a field of view of camera 20 are generally the same as a region occupied by box 24 containing articles 22. In the illustrated embodiment, both range sensor 16 and camera 20 are fixed to a dedicated support 30, however, at least one of range sensor and camera 20 may be attached to the front end of robot 12.

Information processor 16 and robot controller 14 are connected to each other by means of communication means such as communication cable so as to allow them to communicate with each other. In the illustrated embodiment, information processor 16 is indicated as a component separated from robot controller 14, however, information processor 16 may be built into robot controller 14.

As range sensor 18, various types of units may be used. For example, scanning a laser slit light, scanning the article by a laser spot light, projecting a known patter light on the article by using a device such as a projector, and utilizing a flight time from when a light is projected from a projector to when the light is received by a receiver after being reflected by a surface of the article, may be used. In projecting the pattern light on the article, a light source having a discharge tube (typically, a high-pressure mercury lamp), or an arbitrary light source such as a solid state light source (typically, a laser diode or LED) may be used. In addition, by using a non-visible light such as an infrared light source, the measurement can be carried out without being affected by ambient light, etc.

When a camera is a component of range sensor 18, the camera may also be used as camera 20 for obtaining the two-dimensional image as described above. For example, the range sensor may be constituted by two cameras and one projector, and one of the two cameras may be used to obtain the two-dimensional image. Generally, the projector has a shorter life than the camera, and thus the projector must be periodically replaced with another during long-term use thereof. However, by constituting the range sensor by means of the two cameras and by using a pattern light projected from the projector only for associating the same objects to be measured with each other, between images obtained by the two cameras, calibration of the projector may be unnecessary and the projector may be easily replaced with another.

Normally, the range sensor represents the obtained three-dimensional information as a distance image or a three-dimensional map. The distance image means an image representing the three-dimensional information within a measured range, and in many cases, the brightness and the color of each pixel represent the height and the distance from the range sensor. On the other hand, the three-dimensional map means represents the three-dimensional information within the measured range as a set of coordinates (x, y, z) of the measured three-dimensional points. In the present invention, without depending on the representation manner, information obtained by the range sensor is referred to as "three-dimensional information," and at least one element, which constitutes the three-dimensional information (i.e., each pixel in the distance image or three-dimensional points in the three-dimensional map), is referred to as "three-dimensional point data."

Figure 2:
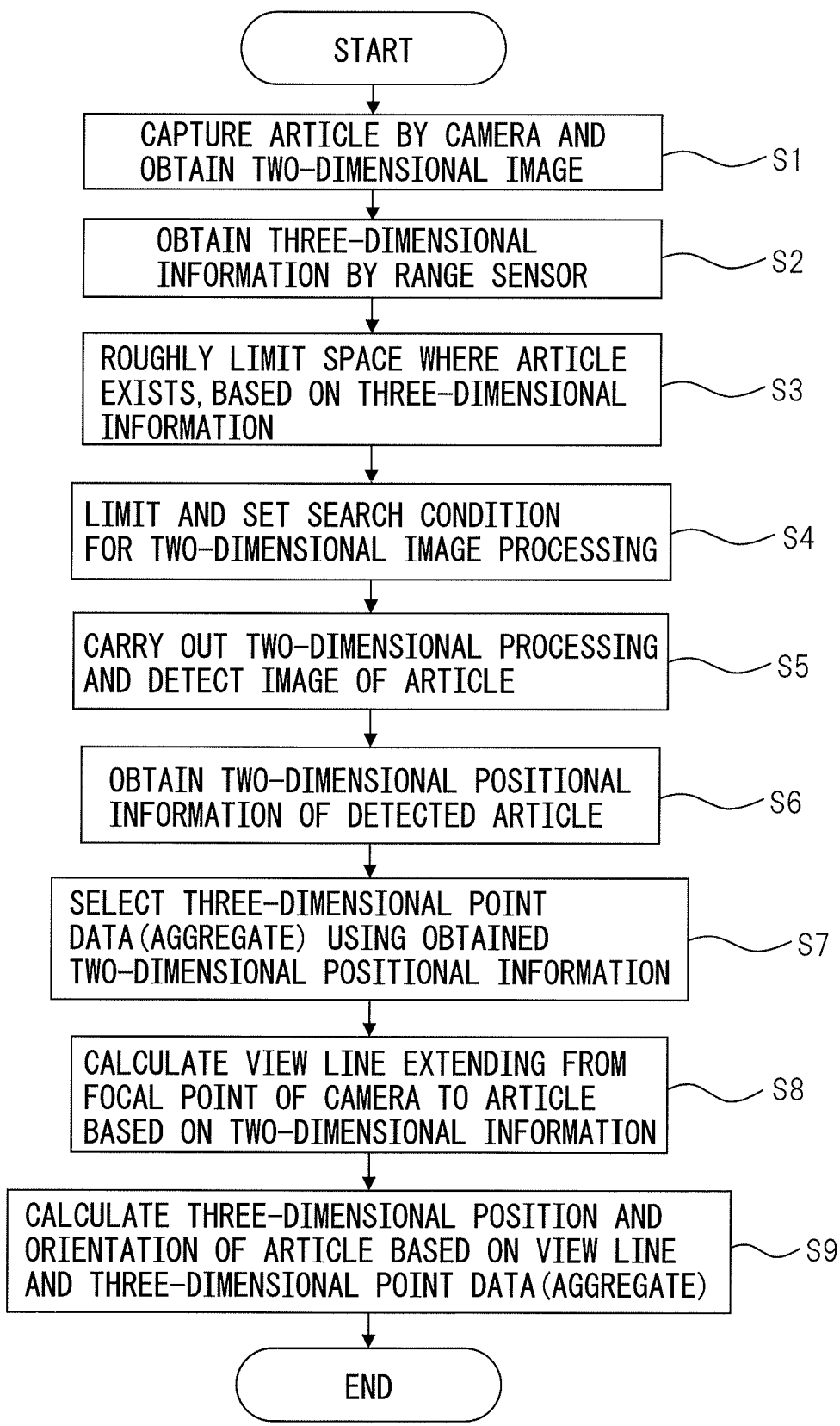
FIG. 2 is a flowchart explaining a process of a recognition method of the invention.

Next, the procedure of the invention for recognizing the three-dimensional position and orientation of the article is explained with reference to a flowchart of FIG. 2 and associating drawings.

First, a two-dimensional image of an entire region, where a plurality of articles are randomly located, is obtained by camera 20 (step S1), and a three-dimensional information of generally the same region as camera 20 is obtained by range sensor 18. In this regard, either obtaining the two-dimensional image or the three-dimensional information may be firstly carried out. In other words, the order of steps S1 and S2 may be changed.

Figure 3:
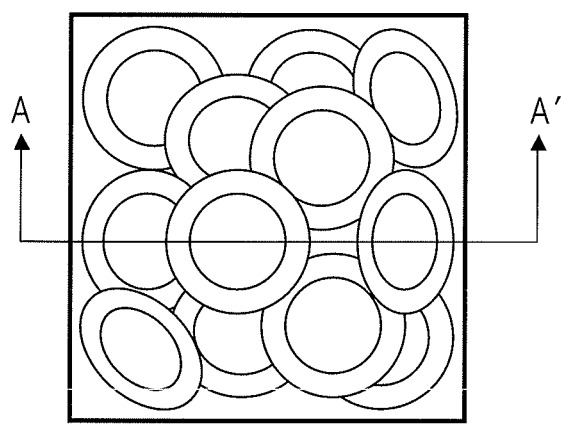
FIG. 3 shows an example of a two-dimensional image including an article, obtained by a camera.
Figure 4:
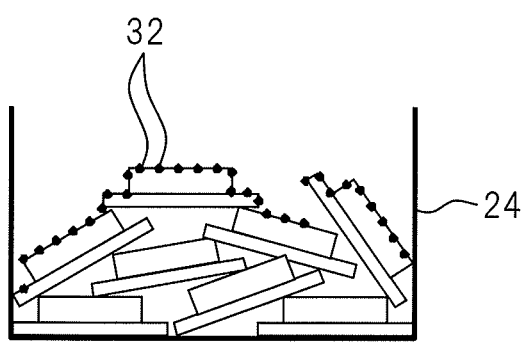
FIG. 4 is a cross-sectional view along A-A' line of FIG. 3.

FIG. 3 shows an example of the two-dimensional image obtained by camera 20, and FIG. 4 shows a cross-section along an A-A' line of FIG. 3. In FIG. 4, black points 32 represent the three-dimensional data measured by range sensor 18.

Then, from the three-dimensional information obtained by range sensor 18, a space, where an article to be taken out is considered to exist, is roughly limited as a target space (step S3). Generally, when a plurality articles are randomly located, the article exiting at a top region is preferentially taken out. Therefore, it is preferable to limit a region at a higher level or close to the camera as the target space.

As the limitation of the target space, following methods may be possible. For example, three-dimensional point data at a position where is higher than a predetermined height (or close to the camera) is searched from the obtained three-dimensional information, and a space near the data may be limited as the target space. Alternatively, a plurality of three-dimensional data higher than a predetermined height (or close to the camera) are selected, and the target space may be calculated as a logical add (OR) of the spaces near the respective data. Alternatively, an average or median value of the heights of the tree-dimensional point data (or the distances from the camera) included in the obtained three-dimensional information is calculated, and a space near the average or median value may be limited as the target space. Alternatively, a flat surface, a curved surface or a combination thereof having a certain surface area is detected from the obtained three-dimensional information, and a space including the detected flat surface, the detected curved surface or the detected combination thereof may be limited as the target space. Alternatively, when the recognition of the three-dimensional position and orientation of the article and the taking out of the article by the robot are repeatedly carried out, a space near the highest position of the article recognized in the previous recognition or the average or median value of the heights of the articles may be limited as the target space.

Next, based on the limited target space, a search condition, for searching the article by the two-dimensional image processing, is set (step S4). In this regard, the search condition means a region for detecting the article on the two-dimensional image obtained by camera 20 or a range of an apparent size of the article to be detected on the two-dimensional image.

The detail of the above search condition is explained below. By projecting an arbitrary three-dimensional point on a light receiving surface of the camera based on calibration data of the camera, it can be calculated where on the two-dimensional image the three-dimensional point forms an image. Such a method is known by, for example, a non-patent document of Tsai et al. (An Efficient and Accurate Camera Calibration Technique for 3D Machine Vision, Proc. Computer Vision and Pattern Recognition '86, pp. 364-374, 1986). For example, in the present invention, by projecting the three-dimensional point data in the space limited in step S3 on the light receiving surface of camera 20 based on the calibration data of camera 20, a region on the two-dimensional image, where the article in the space may form an image, may be limited.

Figure 5:
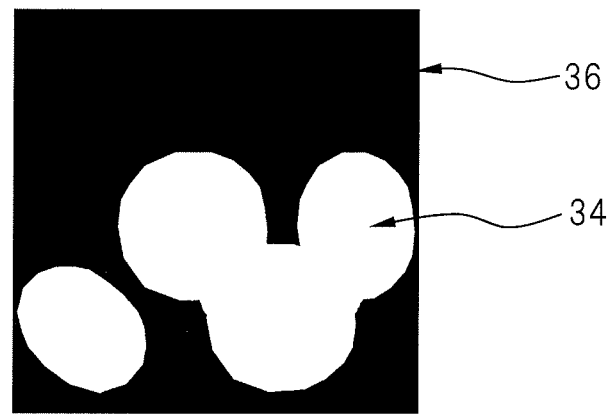
FIG. 5 shows an example of the two-dimensional image obtained by the camera, wherein a search region is represented by white color and the other region is represented by black color.

As an example, when three-dimensional point data 32 as shown in FIG. 4 is obtained, an apex (or a local maximum point of a portion where the height thereof is locally large) is detected from the three-dimensional information within box 24. Then, when a region near the height of the detected apex, an area 34 of the two-dimensional image corresponding to the limited space is represented by white color, and an area 36 other than area 34 is represented by black color, as shown in FIG. 5. White color area 34 is set as the search condition for searching the image of the article by the two-dimensional processing.

An apparent size of the article on the two-dimensional image is proportional to a reciprocal of the distance from the camera to the article. Therefore, for example, based on maximum and minimum values of the height values (or the distance from the camera) of the three-dimensional point data included in the limited space and the height (or the distance from the camera) of the article when a template used for the two-dimensional image processing is taught, a range of a size of the article within the space, which will be imaged on the two-dimensional image, may be set as the search condition.

Alternatively, a range of the two-dimensional image corresponding to the limited space may be divided into a plurality of segments, and different ranges may be set for each segment as the search condition. Alternatively, when the recognition of the three-dimensional position and orientation of the article and the taking out of the article by the robot are repeatedly carried out, a range having a size calculated based on the average or median value of the heights of the articles recognized in the previous recognition may be set as the search condition.

Next, based on the search condition which is set, an image of the article is detected by the two-dimensional image processing (step S5), and two-dimensional positional information (for example, X-Y coordinates) on the image of the article is obtained (step S6). In this regard, arbitrary two-dimensional image processing, such as known template matching, may be used. When an appearance of the article on the image is different due to the different two-sides thereof, or when a plurality of articles have different shapes, a plurality of templates may be provided correspondingly for carrying out the matching.

Figure 6:
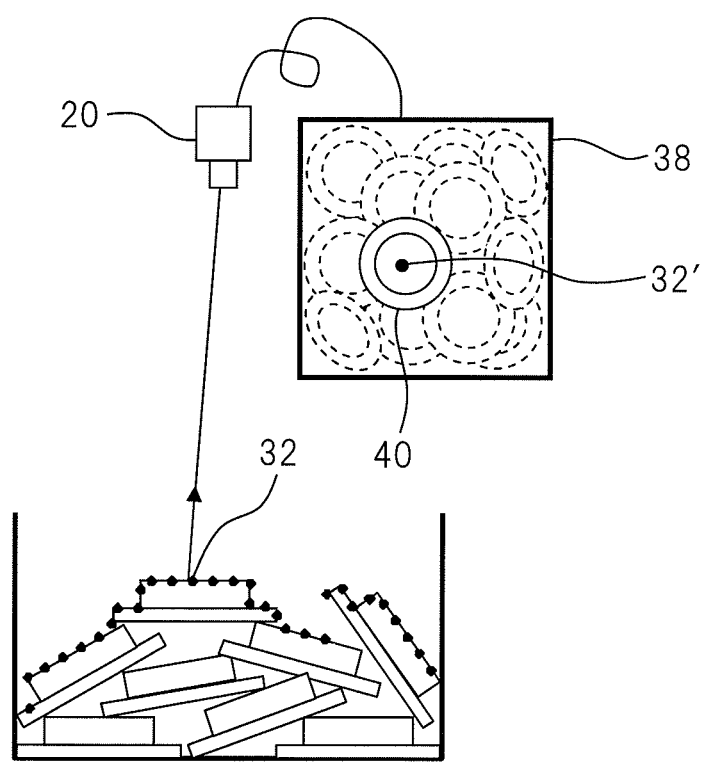
FIG. 6 shows an example for calculating a view line extending from a focal point of the camera to the article.

Next, by using the obtained two-dimensional positional information, first three-dimensional point data (or data aggregate) used to recognize the three-dimensional position and orientation of the article is selected (step S7). For example, as shown in FIG. 6, each of three-dimensional point data 32 included in the three-dimensional information is projected onto light receiving surface 38 of camera 20 based on the calibration data of camera 20. Then, when a projected point 32' which is projected onto light receiving surface 38 is projected in a template 40 corresponding to the article detected by the two-dimensional image processing, it may be judged that the three-dimensional point data is positioned on the article detected by the two-dimensional image processing.

Otherwise, based on the calibration data of camera 20, a plurality of three-dimensional straight lines, extending from a plurality of points on a boundary line of the template corresponding to the article detected by the two-dimensional image processing to a focal point of camera 20, may be calculated. Among the three-dimensional point data included in the three-dimensional information, the three-dimensional point data, within a petrosa formed by the calculated straight lines, may be selected as the three-dimensional point data used to recognize the three-dimensional position and orientation of the article.

Next, based on the two-dimensional positional information obtained in step S6 and the calibration data of camera 20, a view line in the three-dimensional space, extending from a lens center of camera 20 to a three-dimensional position corresponding to the two-dimensional position of the article, is calculated (step S8).

Finally, based on the first three-dimensional point data of the selected article and the view line calculated in step S8, at least one of the three-dimensional position and orientation of the article is calculated (step S9). For example, an approximate plane may be calculated by applying a plane to the three-dimensional point data on the selected article, an intersection between the calculated approximate plane and the view line may be calculated, and the calculated intersection may be determined as the three-dimensional position which represents the article. In this case, when calculating the inclination of the article, information of the approximate plane in a normal direction may be used, and when calculating the direction (a rotational angle about the normal line) of the article, the direction of the template detected on the two-dimensional image may be used. In addition, when the shape of the article can be represented by a function (which is not limited to the plane), the three-dimensional position and orientation of the article may be calculated by applying the function to the three-dimensional point data on the selected article.

Alternatively, when the shape of the article is given as a three-dimensional shape such as a three-dimensional CAD data, the matching between the selected three-dimensional point data considered to exist on the article and the three-dimensional shape of the article may be carried out. In this case, even in the matching of the three-dimensional CAD data, the three-dimensional information as the object of the matching is limited, and thus the matching can be carried out in a significantly short time in comparison to the case wherein the position and orientation for the matching are searched from the entire of the field of view.

As described above, in the present invention, the three-dimensional position and orientation of the article may be recognized by the method as below.

(1) First, a two-dimensional image of an entire of a region, where a plurality of articles are randomly located, is obtained by means of a camera, and a three-dimensional information of generally the same region as the camera is obtained by a range sensor.

(2) Next, from the three-dimensional information obtained by the range sensor, a space, where an article to be taken out is considered to exist, is roughly limited. Generally, when a plurality articles are randomly located, the article exiting at a top region is preferentially taken out, and thus, a space at a higher level is limited, for example.

(3) Next, based on the limited space, a search condition, for searching the article by the two-dimensional image processing, is set. In this regard, the search condition is a region for detecting the article on the two-dimensional image or a range of an apparent size of the article to be detected. For example, by projecting a point within the limited space on a light receiving surface of the camera based on calibration data of the camera, the searching range may be limited in the region of the two-dimensional image corresponding to the limited space. Otherwise, based on the distance between the point within the limited space and the camera, the range of the apparent size of the article projected on the two-dimensional image may be limited.

(4) Next, two-dimensional image processing is carried out based on the search condition which is set, whereby two-dimensional positional information on the image of the article is obtained. In this regard, a known two-dimensional image processing, such as template matching, may be used. Since the search condition is previously limited, the processing can be carried out in a very short time.

(5) Next, by using the two-dimensional positional information, three-dimensional point data used to recognize the three-dimensional position and orientation of the article is selected. For example, each of three-dimensional point data included in the three-dimensional region is projected onto the light receiving surface of the camera based on the calibration data of the camera. Then, when the point data is projected in a template region detected by the two-dimensional image processing, it may be judged that the three-dimensional point data is positioned on the article detected by the two-dimensional image processing.

(6) Finally, based on the two-dimensional positional information and the calibration data of the camera, a view line in the three-dimensional space, extending from a lens center of the camera to the article, is calculated, and then, at least one of the three-dimensional position and orientation of the article is calculated, based on the view line and the selected three-dimensional point data considered to exist on the article.

According to the present invention, the search condition for detecting the two-dimensional position of the article is set based on the three-dimensional information, and the three-dimensional point data for calculating the position and orientation of the article in the three-dimensional space is selected based on the two-dimensional positional information of the article detected in the set search condition. Therefore, the processing of both the two-dimensional image and the three-dimensional information can be carried out with a low calculation cost, and the three-dimensional position and orientation of the article may be effectively calculated.

While the invention has been described with reference to specific embodiments chosen for the purpose of illustration, it should be apparent that numerous modifications could be made thereto, by a person skilled in the art, without departing from the basic concept and scope of the invention.

The invention claimed is:

1. A recognition device for recognizing a three-dimensional position and orientation of an article, the recognition device comprising:

a camera which obtains a two-dimensional image of an entire region wherein a plurality of the same kind of articles are randomly located;

a range sensor which obtains three-dimensional information of a range which is generally the same as the region of the camera; and an information processor which processes the two-dimensional image obtained by the camera and the three-dimensional information obtained by the range sensor, wherein the information processor comprises:

a search condition setting part which sets a region for searching an image of the article in the two-dimensional image, as a search condition, based on the three-dimensional information;

a two-dimensional position obtaining part which detects an image of the article by image processing of the two-dimensional image under the set search condition and obtains two-dimensional positional information of the article on the two-dimensional image;

a view line calculating part which calculates a view line in a three-dimensional space which extends from the camera to the article, based on the obtained two-dimensional positional information;

a three-dimensional point data selecting part which selects first three-dimensional point data used to recognize a three-dimensional position and orientation of the article, from the three-dimensional information, based on the obtained two-dimensional positional information or the view line; and a three-dimensional position and orientation calculating part which calculates at least one of the position and the orientation of the article based on the selected first three-dimensional point data and the view line.

2. The recognition device as set forth in claim 1, wherein the range sensor includes at least one camera and a device for projecting a pattern light, and the camera for obtaining the two-dimensional image is constituted by one of the at least one camera of the range sensor.

3. The recognition device as set forth in claim 1, wherein the range sensor is constituted by a plurality of cameras and a device for projecting a pattern light, and wherein the pattern light is used only to associate the same Objects to be measured with each other, between images obtained by the plurality of the cameras.

4. The recognition device as set forth in claim 1, wherein the range sensor is constituted by at least one camera and a device for projecting a pattern light, and wherein an infrared light is used as a light source of the pattern light.

5. The recognition device as set forth in claim 1, wherein the search condition setting part selects second three-dimensional point data wherein a height value is larger than a predetermined value, from the three-dimensional information obtained by the range sensor; determines a region on the two-dimensional image obtained by the camera corresponding to a space containing the second three-dimensional point data; and limits a range for searching the article on the two-dimensional image within the determined region.

6. The recognition device as set forth in claim 5, wherein, the search condition setting part further limits a range of an apparent size of the article to he searched on the two-dimensional image, based on a height value determined by the predetermined value or a range of values of a height of a space containing the selected second three-dimensional point data.

7. The recognition device as set forth in claim 1, wherein the search condition setting part extracts a flat surface, a curved surface or a combination thereof, from the three-dimensional information obtained by the range sensor; selects second three-dimensional point data corresponding to the extracted flat surface, curved surface or the combination thereof; determines a region on the two-dimensional image obtained by the camera corresponding to a space containing the second three-dimensional point data; and limits a range for searching the article on the two-dimensional image within the determined region.

8. The recognition device as set forth in claim 7, wherein the search condition setting part further limits a range of an apparent size of the article to be searched on the two-dimensional image, based on a range of values of a height of the selected second three-dimensional point data.

9. The recognition device as set forth in claim 1, wherein the search condition setting part sets the region as being three-dimensional point data that is within a predetermined distance from the range sensor.

10. A recognition method for recognizing a three-dimensional position and orientation of an article, the method comprising the steps of:

obtaining a two-dimensional image of an entire region wherein a plurality of the same kind of articles are randomly located, by means of a camera;

obtaining three-dimensional information of a range which is generally the same as the region of the camera, by means of a range sensor;

setting a region for searching an image of the article in the two-dimensional image, as a search condition, based on the three-dimensional information;

detecting an image of the article by image processing of the two-dimensional image under the set search condition and obtaining two-dimensional positional information of the article on the two-dimensional image;

calculating a view line in a three-dimensional space which extends from the camera to the article, based on the obtained two-dimensional positional information;

selecting first three-dimensional point data used to recognize a three-dimensional position and orientation of the article, from the three-dimensional information, based on the obtained two-dimensional positional information or the view line; and calculating at least one of the position and the orientation of the article based on the selected first three-dimensional point data and the view line.

11. The recognition method as set forth in claim 10, wherein the step of setting the search condition comprises: selecting second three-dimensional point data wherein a height value is larger than a predetermined, value, from the three-dimensional information obtained by the range sensor; determining a region on the two-dimensional image obtained by the camera corresponding to a space containing the second three-dimensional point data; and limiting a range for searching the article on the two-dimensional image within the determined region.

12. The recognition method as set forth in claim 11, wherein the step of setting the search condition further comprises limiting a range of an apparent size of the article to be searched on the two-dimensional image, based on a height value determined by the predetermined value or a range of values of a height of a space containing the selected second three-dimensional point data.

13. The recognition method as set forth in claim 10, wherein the step of setting the search condition comprises: extracting a flat surface, a curved surface or a combination thereof, from the three-dimensional information obtained by the range sensor; selecting second three-dimensional point data corresponding to the extracted flat surface, curved surface or the combination thereof; determining a region on the two-dimensional image obtained by the camera corresponding to a space containing the second three-dimensional point data; and limiting a range for searching the article on the two-dimensional image within the determined region.

14. The recognition method as set forth in claim 13, wherein the step of setting the search condition further comprises limiting a range of an apparent size of the article to be searched on the two-dimensional image, based on a range of values of a height of the selected second three-dimensional point data.

15. The recognition method as set forth in claim 10, wherein the step of setting a region sets the region as being three-dimensional point data that is within a predetermined distance from the range sensor.

* * * * *